April 9, 1957     ASAO INOUE     2,787,935
OPTICAL PROJECTION CONDENSING LENS SYSTEM
OF VARIABLE MAGNIFICATION OF THE CROSS
SECTION OF THE LIGHT RAY BUNDLE
Filed May 18, 1955

I            II

INVENTOR.
ASAO INOUE
BY
ATTORNEY

United States Patent Office 2,787,935
Patented Apr. 9, 1957

2,787,935

OPTICAL PROJECTION CONDENSING LENS SYSTEM OF VARIABLE MAGNIFICATION OF THE CROSS SECTION OF THE LIGHT RAY BUNDLE

Asao Inoue, Setagaya-ku, Tokyo, Japan, assignor to Nippon Kogaku K. K., Tokyo, Japan, a corporation of Japan Application May 18, 1955, Serial No. 509,341
In Japan September 30, 1946

Public Law 619, August 23, 1954
Patent expires September 30, 1966

4 Claims. (Cl. 88—24)

This invention relates to an optical system to collect an increased number of light rays thereby increasing the light intensity in a variable magnifying device.

The object of this invention is constantly to direct a maximum amount of light to a projection aperture in most effective manner without regard to the degree of variable magnification by obviating the possible reduction in the amount of light caused by an increase in the degree of magnification by the use of a simple apparatus having a minimum number of lenses.

A clear conception of the scope and purpose of the invention may be obtained from the following description, taken in connection with the appended drawing, in which.

Figure 3:
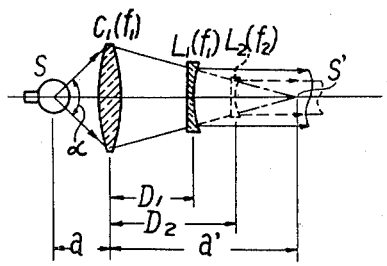
Figure 3:
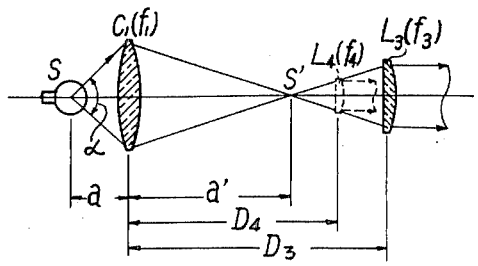

Fig. 3I and Fig. 3II illustrate the concept of the invention and assist in the explanation of the mathematical equation of this invention, particularly in Fig. 3II where interchangeable positive lenses are used.

Figure 1:
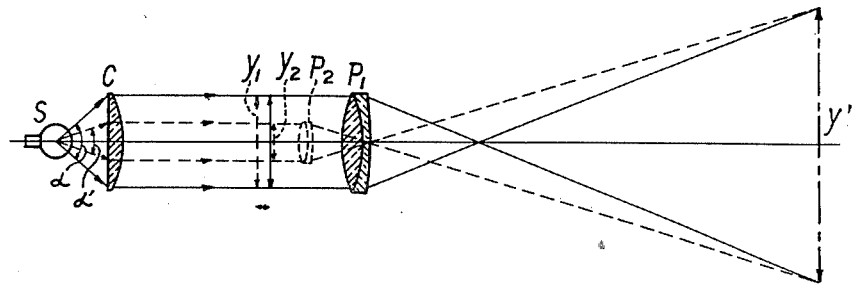
Fig. 1 shows the course of rays in a conventional projection inspection device of the variable magnification type hitherto used.

For measuring instruments, where high precision is of vital importance, the method of illumination by a parallel beam of rays is likely to be used, where, as briefly illustrated in Fig. 1, a ray of light emanating from a point source of light $s$, for example, is formed into a parallel beam of rays through a collecting lens C, thus, in the case of a low magnification, illuminating the object under inspection $y_1$ producing an image $y'$ on the image plane of the projecting lens of a low magnifying power $P_1$, and, in case of a high magnification, illuminating $y_2$ producing an image $y'$ on the image plane through a projecting lens of a high magnifying power $p_2$. The prior known method naturally involves the defect that when using high magnifying power, a conspicuously dark image $y'$ is produced since only a portion (solid angle $a'$) of the pencil of light is directed on projecting lens $p_2$ through collecting lens C.

The purpose of the instant invention, it will be recalled, is to improve the method illustrated in Figure 1 so as to produce constantly at the projection aperture the maximum and most effective amount of light by obviating the possible reduction in the amount of light caused by a variable magnification likely to occur in the method of illumination by a parallel beam of rays. Our present invention, it will be further noted, is mainly dealt with in promoting further devices from the above method to simplify the construction of the apparatus and to reduce the number of lenses so as to obviate the loss in the amount of light and yet to secure a similar object satisfactorily. The technical conception can be grasped in the embodiments shown in Figures 2, 3I and 3II.

A pencil of light emitted from a point source of light S through a fixed positive lens $C_1$ (the first light collecting lens which is always used and never interchanged with any other lens) is formed into a parallel beam of rays having such a width of the pencil of light as to properly adapt the projecting lenses of variable magnification, for example $p_1$, $p_2$, etc., through a second light collecting lens such as negative lenses, for example $L_1$ or $L_2$ (Figures 2 and 3I) or positive lenses, for example $L_3$ or $L_4$ (Figure 3II), and consequently to be directed through the projecting lens then in use. Thus with the total amount of light passing through the first light collecting lens and directed through the projecting lenses of variable magnification is the same in all cases.

Figure 2:
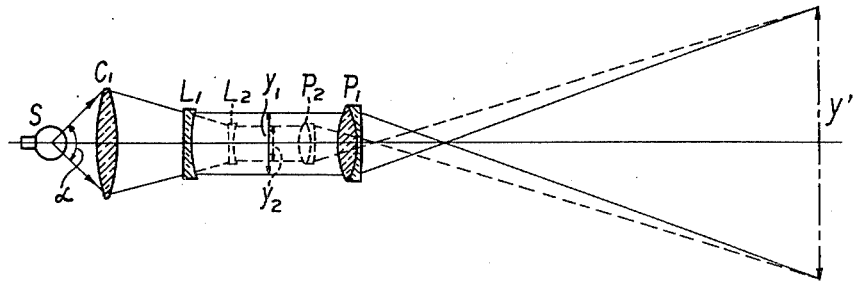
Fig. 2 shows one embodiment of this invention using interchangeable negative lenses.

It follows therefore that it is quite natural, when a negative lens is used as the second light collecting lens, as shown in Fig. 2 and Fig. 3I, to position the said lens in front of the focal point $s'$ of the first light collecting lens $C_1$ and when a positive lens is used as such second light collecting lens, as shown in Fig. 3II, to position the said lens in the beyond, in the direction of light travel, such focal point $S'$ of the first collecting lens $C_1$. Thus with low magnifying power the total amount of light collected by lens $C_1$ is directed through the projection lens $P_1$ by assembling the lens $C_1$ with lens $L_1$ or the projection $L_3$ having the longer focal length and the larger diameter. And in the case of a high magnifying power, the parallel beam of light, of reduced width so as completely to pass the total light through the projecting lens $P_2$ of a smaller diameter than projecting lens $P_1$ is obtained by interchanging the second light collecting lens $L_1$ or $L_3$ with either lens $L_2$ or $L_4$ having a shorter focal length and a smaller diameter. Only a single one of the second light directing lenses, $L_1$, $L_2$, $L_3$ or $L_4$, is used at a time with the light collecting lens $C_1$. The others of the second light directing lenses not in use at a given time are kept out of the optical system, the interchange of any one of these lenses with another of them being arranged to remove from, and to position at, the predetermined position along the optical axis of the lens system each of the lenses rapidly and positively, for example by means of revolving turrets, switch levers, etc.

The conditions of assembling to permit the pencil of light after passing in its entirety through the second light collecting lens positioned on the optical axis always to produce parallel light rays which are projected through the projection lens are given by the expression:

$$D_k = a' + fk$$

where $f$ is the focal length of the first light collecting lens $C_1$; $fk$ ($-fk$ for the negative lenses) is the focal length of the second light directing lens $L_1$, $L_2$, $L_3$ or $L_4$; $s'$ is the image of the source of light $s$ through $C_1$; $-a$ is the distance between $C_1$ and $s$;

$$a' \left( \text{subject to } \frac{1}{a'} = \frac{1}{f} + \frac{1}{a} \right)$$

is the distance between $C_1$ and $s$; $D_k$ is the distance between $C_1$ and $L_1$, $L_2$, $L_3$, or $L_4$.

The above embodiment relates to the double variation of the diameter of the pencil of rays. Where a triple variation or higher is desired, it will be sufficient for the purpose in assembling suitably with the first light collecting lens $C_1$ with three or more lenses of predetermined and different focal lengths for the second collecting lens.

To conclude briefly it is clear now that this invention provides an optical projection system, in which the amount of light collected from a source and used to project a magnified image of an object under inspection, remains constant irrespective of the degree of magnification, that is, the total amount of light passing through the projection aperture does not vary from the maximum and fixed amount of light from the source. At the same time a predetermined ratio of a magnification may be selected which produces no error in measurement by virtue of the illumination by the parallel beam of the light rays. The instant device is easily operable since the variation in the pencil of rays is made by interchanging the second light directing lens located remote from the source of light.

I claim:

1. An optical projection system with a constant quantity of projected light comprising a spatially fixed light source, a first lens means spaced from the light source and adapted to produce a converging output light beam, an object at a fixed distance from the first lens means and of a variable dimension perpendicular to the optical axis of the source and the first lens means, a screen at a fixed distance along the optical axis from the first lens means, a second lens means of interchangeable focal length spaced from the first lens means along the optical axis in the converging beam and adapted to produce a beam of output parallel light rays of a transverse diameter equal to such dimension of the object perpendicular to the optical axis, and a third lens means spaced from the object and producing a real image on the screen, the third lens means being of a diameter equal to that of the parallel beam of light rays, of a focal length, and positioned along the optical axis spaced from the second lens means to produce the real image of constant size on the screen.

2. An optical projection system according to claim 1 in which the second lens means is a negative lens positioned along the optical axis a distance from the first lens means which is less than the distance therefrom to the image formed by the first lens means per se of the source.

3. An optical system according to claim 1 in which the second lens means is a positive lens positioned along the optical axis a distance from the first lens means which is greater than the distance therefrom to the image formed by the first lens means per se of the source.

4. An optical projection system according to claim 1 in which the distance of the second lens means from the first lens means is equal to the distance between the first lens means and the image which the first lens means per se forms of the light source plus algebraically the focal length of the second lens means.

References Cited in the file of this patent

UNITED STATES PATENTS

| | | |
|---|---|---|
| 1,426,722 | Evans | Aug. 22, 1922 |
| 1,720,011 | Stark | July 9, 1929 |
| 1,887,650 | Larner et al. | Nov. 15, 1932 |
| 2,050,860 | Rantsch | Aug. 11, 1936 |
| 2,225,485 | Rantsch | Dec. 17, 1940 |
| 2,587,956 | Bastien | Mar. 4, 1952 |